United States Patent Office 3,430,439
Patented Mar. 4, 1969

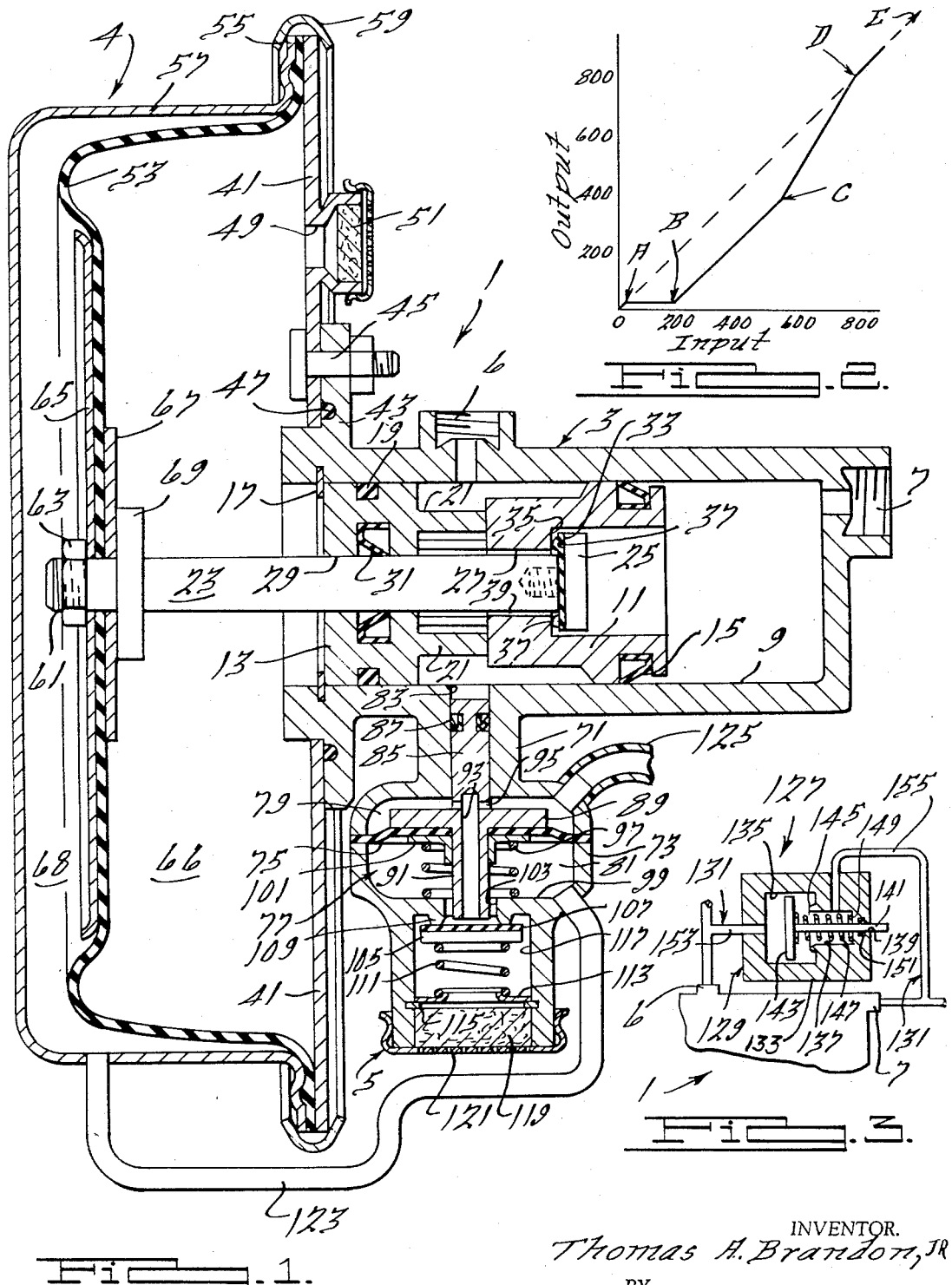

3,430,439
REGULATING DEVICE
Thomas A. Brandon, Jr., Ann Arbor, Mich., assignor to Chrysler Corporation, Highland Park, Mich., a corporation of Delaware
Filed Aug. 18, 1967, Ser. No. 662,850
U.S. Cl. 60—54.5                                    8 Claims
Int. Cl. F15b 7/08, 15/10

ABSTRACT OF THE DISCLOSURE

Regulating device for use in a vehicular hydraulic brake system having disc brakes on the front wheels and drum brakes on the rear wheels. The device includes a housing having a piston movable therein with an inlet and outlet being formed in the housing on opposite sides of the piston. A pressure differential operated diaphragm exerts a hold-back force on the piston. The force exerted by the pressure differential diaphragm may be overcome by the control valve operable to reduce the pressure differential on said diaphragm in response to an increase in the inlet pressure above a predetermined pressure.

BACKGROUND OF THE INVENTION

This invention relates to regulating devices, and more particularly to a device for regulating or proportioning the hydraulic pressure applied to automotive braking mechanisms.

Many automotive vehicles are presently being equipped with disc brakes on the front wheels and drum brakes on the rear wheels. It will be understood that drum brakes incorporate relatively heavy springs for (1) maintaining the brake shoes in a retracted position until pressure is applied to a brake pedal by the vehicle operator, and (2) for returning the shoes to a retracted position after a depressed brake pedal is released. The forces exerted by these springs must first be overcome by the hydraulic pressure developed by the master cylinder before the shoes will be moved toward the drums.

Disc brakes do not have the relatively heavy spring loads attendant to the drum brakes. Accordingly, to prevent the actuation of the disc brakes at a hydraulic pressure substantially lower than the drum brakes, and because of basic differences in torque curve profile between disc brakes and duo-servo drum brakes, thusly resulting in unbalanced braking, i.e., substantially different torque curves for the front wheel and rear wheel brakes, valves must be provided to proportion or balance the application of hydraulic pressure to the disc and drum brakes for obtaining optimum balance of the vehicle braking. Heretofore, one type of system for regulating the hydraulic pressure applied to the disc and drum brakes included two separate valves, one valve being a pressure metering valve for the front disc brakes and the other valve being a rear drum brake proportioning valve. The present invention combines the functions of the two valves into a single valve construction.

SUMMARY OF THE INVENTION

Briefly, a regulating device of this invention includes a housing having a bore therein, an inlet adapted to be connected to the master cylinder of a hydraulic braking system and an outlet adapted to be connected to disc brakes on the front wheels of the vehicle in which the regulating device is installed, first means for establishing communication between the inlet and the outlet when the inlet pressure is below a first predetermined pressure, and for blocking communication between the inlet and the outlet when the inlet pressure is above a first predetermined pressure, second means for preventing a substantial increase in the outlet pressure as the inlet pressure increases from the first predetermined pressure to a second predetermined pressure, the outlet pressure increasing in a substantially 1:1 ratio to the inlet pressure as the latter increases from the second predetermined pressure to a third predetermined pressure, and third means for permitting the outlet pressure to increase at a faster rate than the rate of increase of the inlet pressure as the latter increases from the third predetermined to a fourth predetermined pressure, the outlet pressure increasing in a substantially 1:1 ratio to the inlet pressure as the latter is increased above the fourth predetermined pressure.

One of the primary objects of the present invention is to provide a regulating device adapted to permit the maintenance of proper brake balance between the front disc brakes and the rear drum brakes of a vehicle over the entire braking torque range and road coefficient range.

A further object is to provide a regulating device of the class described which combines the function of a front disc brake pressure metering valve and a rear drum brake proportioning valve.

Another object is to provide a regulating device of the type described which is more efficient and has significantly less hysteresis losses than conventional two-valve systems.

A further object is to provide a regulating device such as described which results in nearly simultaneous 4-wheel skid on ice, packed snow, loose snow, wet and dry road surfaces.

Still another object is to provide a regulating device of the class described which is simple and economical in construction and efficient in operation.

Other objects and advantages of this invention will become apparent as the description progresses.

BRIEF DESCRIPTION OF THE DRAWINGS

In the accompanying drawings, in which two of various possible embodiments of this invention are illustrated:

FIG. 1 is a longitudinal cross section of a device constructed in accordance with this invention;

FIG. 2 is a graph of the braking pressure performance resulting when the device of this invention is tested on a vehicle braking system such as described; and FIG. 3 is a fragmentary side elevation of a modified form of this invention, certain parts being shown in section for clarity.

Like parts are represented by corresponding reference characters throughout the drawings.

DESCRIPTION OF THE PREFERRED EMBODIMENT

Referring now to FIG. 1 of the drawings, wherein the output hydraulic pressure from a master cylinder and the input hydraulic pressure to the vehicle braking mechanisms are plotted, the broken line AE represents the pressure curve for the rear drum brakes. Since the master cylinder is connected directly to the rear drum brakes, the master cylinder output pressure and the pressure applied to the rear drum brake mechanisms are equal, and hence, the curve AE is a straight line extending at a slope of 1:1. The line AE would also be representative of the hydraulic pressure applied to the front disc brake mechanism if a device of this invention were not incorporated in the braking system. However, since the spring or resistance forces which must be overcome before the brakes are actually applied are much greater for rear drum brakes than front disc brakes, and since torque curve profile for the two sets of brakes would be very different, if both sets of brakes had pressure curves were as shown by the broken line AE, i.e., there would be unbalanced braking. The device of this invention is adapted to modify the effective pressure curve for the front disc brake system in such a manner that the torque curve for such brake system closely parallels the torque drive for the rear drum brake system.

A pressure regulating device of this invention is generally indicated at 1 in FIG. 1. This device includes a hollow main housing section 3, a chamber forming and hold-back assembly 4, and a control valve assembly 5. Housing section 3 has an inlet 6 adapted to be connected to a master cylinder (not shown), and an outlet 7 adapted to be connected to the actuating mechanisms for the front wheel disc brakes. It will be understood that the master cylinder is directly connected to the actuating mechanisms for the rear drum brakes.

Housing section 3 is provided with a cylindrical bore 9 in which a piston 11 and a reaction member 13 are slidably mounted. Piston 11 is generally cup-shaped and has an annular seal 15 around its peripheral edge. Reaction member 13 is adapted to seat against a snap ring 17 and is sealed against bore 9 by an O-ring seal 19. A plurality of fingers 21, spaced apart from one another, extend from reaction member 13 toward piston 11.

A rod 23 having a valve head 25 at one end extends through a bore 27 in the bottom of cup-shaped piston 11 and a bore 29 in reaction member 4. An annular seal 31 in reaction member 13 surrounds the shank of rod 23 passing through the member. A resilient seal 33 is provided around rod 23 between head 25 and a seat 35 formed in the bottom of the cup-shaped piston 11. Seal 33 has a plurality of spaced protuberances 37 which are adapted to hold the seal away from seat 35 when the forces tending to seat the head 25 on seat 35 are below a predetermined level as will be made apparent hereinafter. When the aforementioned forces exceed the predetermined level, the protuberance 37 will collapse or be pressed into the seal and communication between bore 27 and the inside of cup-shaped piston 11 will be blocked. In this regard it will be noted that the diameter of bore 27 is larger than the diameter of rod 23, thereby providing a space 39. Space 39 is in constant communication with inlet 6 through the spaces between fingers 21.

Chamber-forming member 4 includes an annular plate 41 connected to a flange 43 on housing section 3 by fasteners 45. An annular sealing ring 47 is provided between plate 41 and housing 3. Plate 41 has a vent port 49 therein placing the inside of the chamber-forming member adjacent the port in communication with the atmosphere. An air cleaner 51 may be provided to prevent the ingress of foreign matter to the chamber-forming member.

The periphery of a flexible diaphragm 53 is clamped between a flange 55 on a cover 57 and the outer margin of plate 41 by a crimped or clamping ring 59. A threaded extension 61 is provided on the end of rod 23 opposite head 25 and extends through the center of diaphragm 53. A nut 63 clamps two plates 65 and 67 and diaphragm 53 against a shoulder 69 on rod 23. Diaphragm 53 divides the chamber formed by plate 41 and cover 57 into two compartments 66 and 68. As will be made apparent, the differential between the pressures on opposite sides of the diaphragm 53 affects the sealing effectiveness of seal 33, the movement of piston 11, and the pressure at outlet 7.

Control valve assembly 5 includes a first body portion 71 and a second body portion 73 connected together by suitable fastening means (not shown) to form a sub-housing with a flexible diaphragm 75 clamped between the two body portions. Diaphragm 75 separates a compartment 77 into two chambers 79 and 81. Body portion 71 has a subbore 83 therein connecting bore 9 with chamber 79. A piston 85 is slidably positioned in bore 83 and has a seal 87 at one end blocking communication between bore 9 and chamber 79. Piston 85 has an annular shoulder 89 formed thereon above diaphragm 75 as viewed in FIG. 2, and a tubular extension 91 extending from shoulder 89 through the diaphragm. The extension 91 has a bore 93 therein which is placed in communication with chamber 79 by ports 95. It will be seen that pressure on the upper end of piston 85 tends to force piston 85, shoulder 89, diaphragm 75 and extension 91 downwardly. Downward movement of these components is resisted by a spring 97 extending between an internal annular flange 99 on body portion 73 and a washer-sleeve member 101 located adjacent the lower side of diaphragm 75.

Extension 91 extends through an opening 103 in flange 99 into engagement with a valve member 105 having a resilient covering 107. Valve member 105 is biased toward a seat 109 by a spring 111 reacting against a washer 113 resting on a snap ring 115. The valve member 105, spring 111, washer 113 and snap ring 115 are located in a bore 117 in body portion 73. An air filter 119 is held in the outer end of bore 117 by a retainer 121. The outer end of bore 117 opens into the atmosphere.

Chamber 81 is maintained in constant communication with compartment 68 by a conduit or line 123. It will be seen that the valve member 105 is adapted to be moved off seat 109 upon downward movement of piston 85, and when the valve member 105 is so moved, compartment 68 is placed in communication with the atmosphere through line 123, chamber 81, opening 103, bore 117 and air filter 119.

Chamber 79 is placed in communication with the intake manifold of the vehicle engine by a line 125. When the parts are in the position shown in FIG. 1 the low pressure created in chamber 79 by the connection thereof with the intake manifold is communicated to the chamber 81 through ports 95 and bore 93. The low pressure in chamber 81 also exists in compartment 68 due to line 123. When a low pressure exists in compartment 68, the atmospheric pressure in compartment 66 tends to move the rod 23 to the left as viewed in FIG. 2, thus maintaining the proturbances 37 of seal 33 engaged with seat 35. The protuberances will collapse and the seal completed when the hydraulic pressure on head 25 is increased to force the head 25 toward seat 35. However, when the piston 85 is moved downwardly a sufficient distance, valve member 105 will become seated on extension 91. Further travel will cause unseating of valve member 105 from seat 109 thus causing atmospheric pressure to be introduced to compartment 68 through line 123, chamber 81, opening 103 and bore 117.

Assuming the parts are in the positions shown in FIG. 1, operation of the device during the application of force to a brake pedal is as follows:

Initially, it may be assumed that the intake manifold pressure is introduced to the compartment 68, through line 125, chamber 79, ports 95, bore 93, chamber 81 and line 123. The atmospheric pressure in compartment 66 thus tends to hold the rod in its FIG. 1 position. When the hydraulic pressure from the master cylinder is initially low, such as 1–10 p.s.i., for example, the hydraulic pressure applied to the end of the rod 23 tending to move the rod to the left also tends to maintain the rod, and the piston 11, due to its engagement with protuberances 37, in its FIG. 1 position. Thus the pressure differential on diaphragm 53 and the hydraulic pressure on rod 23, combine to maintain the rod 23 and piston 11 substantially in their FIG. 1 position. The protuberances 37 will not collapse under the low pressure so that the valve formed by seat 35 and seal 33 remains open. As the hydraulic pressure approaches a predetermined value, such as 10 p.s.i., for example, the hydraulic pressure on rod 23 results in a force on the head 25 which tends to collapse the proturberances 37, i.e., close the valve. However, complete closure is not obtained until the predetermined hydraulic pressure is reached. The line OA in FIG. 2 represents the pressure curve during this initial phase.

When the pressure of the hydraulic fluid from the master cylinder is increased above 10 p.s.i., the protuberances have collapsed and the seal 33 effectively blocks communication between inlet 6 and outlet 7, thereby preventing any increase in the outlet or front disc brake pressure. The piston 11 and rod 23 are prevented from moving to the right, as viewed in FIG. 1 as the input pressure increases, by the pressure differential hold-back diaphragm 53 and the hydraulic pressure on rod 23, the sum of which results in a force by head 25 on piston 11. This condition exists until the inlet hydraulic pressure is increased to about 200 p.s.i., for example, and the line AB is representative of pressure curve during this period.

When in the inlet hydraulic pressure exceeds approximately 200 p.s.i., the holding action exerted on rod 23 and piston 11 by the pressure differential between compartments 66 and 68 can no longer be maintained, i.e., the hydraulic pressure at the inlet 6 exerts a greater force on the affected area of the piston 11, i.e., the piston area minus the area of the rod 23, than the force exerted thereon by the head 25. Accordingly, the piston 11 begins to move to the right and the hydraulic pressure at the outlet to the front disc brakes increases generally linearly as the hydraulic pressure at input 6 increases. This condition exists until the hydraulic pressure from the master cylinder, at inlet 6, reaches approximately 500 p.s.i., for example, and is represented by the line BC on the FIG. 1 graph.

The piston 85 gradually moves downward, as the inlet pressure increases, against the bias of spring 97. At some point as the inlet pressure is increased to approximately 500 p.s.i., the valve spring 97 is overcome allowing the extension 91 of the piston to seal on the covering 107 of valve member 105. However, the valve member 105 is maintained against seat 109 by spring 111 until the hydraulic pressure at inlet 6 is increased a small amount to overcome vacuum differential across valve 105 and valve return spring 111.

When the inlet pressure begins to exceed approximately 500 p.s.i., valve 105 is moved off set 109 by the extension 91 thus admitting atmospheric pressure to chamber 81, line 123 and compartment 68. This reduces the pressure differential between compartments 66 and 68 thereby reducing the holding effect on rod 23 and piston 11, and the piston 11 moves to the right under the influence of the inlet hydraulic pressure. The outlet hydraulic pressure is thus increased, and this is at a more rapid rate than the rate of increase of the input hydraulic pressure at inlet 6, i.e., the outlet pressure approaches the inlet pressure because the resistance to movement of rod 23 and piston 11 offered by the pressure differential between compartments 66 and 68 is reduced as the pressure differential is reduced. This period is shown by line CD on the FIG. 1 graph. The valve member 105 continues to meter atmospheric pressure to the compartment 68 in a modulating fashion by the relationship between the forces of springs on the valve and by the relationship between the valve and diaphragm areas until the inlet pressure reaches approximately 800 p.s.i., at which point the valve member 105 is completely unseated from seat 109, and atmospheric pressure exists on both sides of diaphragm 53. The resistance offered by the pressure differential to movement of rod 23 and piston 11 is thus removed and the outlet pressure increases linearly as the input pressure increases.

When the brake pedal is released, only a slight hysteresis loop may be experienced before the pressure returns on a slope generally parallel to the slope of the broken line AE.

When pressure is applied to the front disc brakes generally in accordance with the solid line ABCDE, the torque curve of the disc brakes will be generally similar to the torque curve of the rear drum brakes, thus resulting in relatively balanced braking of the vehicle.

It will be seen that the function of seal 33 is solely to provide for free flow of hydraulic fluid between inlet 6 and outlet 7 when the braking system is in an unapplied position. This free flow of hydraulic fluid permits fluid compensation, i.e., it allows for the expansion or contraction of fluid due to temperature changes. Other methods and devices may be utilized to permit fluid compensation and one such device 127 is shown in FIG. 3. Device 127 comprises a valve assembly 129 connected in a line 131 extending between inlet 6 and outlet 7. Valve assembly 129 comprises a body 133 having first bore 135, a second bore 137, and a third bore 139. A movable plunger 141 has a head 143 adapted to seal on a seat 145. Head 143 is biased away from seat 145 by a spring 147 reacting against a shoulder 149 at the end of bore 137. Plunger 141 extends through bore 137 and bore 139 to the atmosphere, with a suitable seal 151 provided in bore 139. Line 131 includes a first portion 153 extending between the inlet pressure line for device 1 and bore 135, and a second portion 155 connected between bore 137 and the outlet pressure line for device 1. The spring and dimensions of plunger 141 are such that if the inlet hydraulic pressure exceeds 10 p.s.i., for example, the biasing forces urging head 143 away from seat 145 are overcome by the hydraulic pressure and the head seals on seat 145. If a device such as illustrated at 127 is incorporated in this invention, the seal 33 may be eliminated and the rod 23, head 25 and piston 11 may be integrally formed without any opening therethrough. The device 127, when incorporated with device 1, permits the hydraulic pressure to return along line EDCBAO, and this characteristic is desirable for several reasons. One reason it is desirable for the curve to return along line EDCBAO rather than EDA is that upon reapplication of the brakes at any point between D and B, the output pressure immediately begins to rise as the input pressure rises. Another reason is that the position of piston 11 is maintained under all pressure conditions. If the curve were to return along the broken line DA, the curve upon reapplication of pressure to the brake pedal, would initially move from some point on the broken line DA horizontally until it arrived at the solid line BCD. Thus, the input pressure would have to be increased some amount before there would be any increase in output pressure.

In view of the foregoing it will be seen that the several objects and other advantages of this invention are achieved.

Although only two embodiments of the invention have been disclosed and described, it is apparent that other embodiments and modifications of the invention are possible within the scope of the appended claims.

I claim:

1. A pressure regulating device comprising a main housing having a bore therein, said housing having an inlet and an outlet, a movable piston in said bore, means for establishing communication between said inlet and said outlet when the inlet pressure is below a first predetermined pressure, and for blocking communication between said inlet and said outlet when said inlet pressure is above said first predetermined pressure, hold-back means exerting a holding force on and preventing substantial movement of said piston as said inlet pressure increases from said first predetermined pressure to a second predetermined pressure, said force exerted by said hold-back means being overcome and said piston being moved when said inlet pressure is increased above said second predetermined pressure, said hold-back means continuing to exert said holding force on said piston as the latter moves, said outlet pressure increasing at approximately the same rate as said inlet pressure increases as the latter is increased from said second predetermined pressure to a third predetermined pressure, and means for reducing the effectiveness of said hold-back means to reduce the forces exerted thereby on said piston as the inlet pressure increases above said third predetermined pressure, said hold-back means being rendered substantially ineffective when the inlet pressure reaches a fourth predetermined pressure.

2. A pressure regulating device as set forth in claim 1 wherein said hold-back means includes a chamber having a diaphragm dividing it into first and second compartments, said first compartment being in constant communication with the atmosphere, means creating a sub-atmospheric pressure, means connecting said second compartment with said means creating a sub-atmospheric pressure, and means connecting said diaphragm to said piston.

3. A pressure regulating device as set forth in claim 2 wherein said means connecting said second compartment with said means creating a subatmospheric pressure comprises a hollow subhousing having a subbore opening into said bore in said main housing, a piston member in said subbore, said subhousing having a diaphragm dividing it into two chambers, said piston member extending through said first chamber in said subhousing and through said diaphragm in said subhousing into said second chamber in said subhousing, means connecting said first chamber in said subhousing to said means creating a subatmospheric pressure, means connecting said second chamber in said subhousing to said second compartment, and said piston member having passages extending from the end thereof in said second chamber in said subhousing through said piston member to said first chamber in said subhousing.

4. A pressure regulating device as set forth in claim 3 wherein said means for reducing the effectiveness of said hold-back means comprises a passage in said subhousing connecting said second chamber therein with atmospheric pressure, a movable valve mmeber adapted to close said passage in said subhousing and biased toward a closed passage position, said piston member being adapted to move said valve member toward an open passage position when inlet pressure increases above said third predetermined pressure.

5. A pressure regulating device for a vehicular hydraulic brake system having disc brakes on the front wheels and drum brakes on the rear wheels and a master cylinder for applying pressure to hydraulic fluid in brake lines, said device comprising a main housing having a bore therein, an inlet adapted to be connected to the master cylinder and an outlet adapted to be connected to the disc brakes, first means for establishing communication between said inlet and said outlet when the inlet pressure is below a first predetermined pressure and for blocking communication between said inlet and said outlet when the inlet pressure is above, a first predetermined pressure, second means for preventing a substantial increase in the outlet pressure as the inlet pressure increases from said first predetermined pressure to a second predetermined pressure, said outlet pressure increasing in a substantially 1:1 ratio to said inlet pressure as the latter increases from said second predetermined pressure to a third predetermined pressure, and third means for permitting said outlet pressure to increase at a faster rate than the rate of increase of said inlet pressure as the latter increases from said third predetermined to a fourth predetermined pressure, said outlet pressure increasing in a substantially 1:1 ratio to said inlet pressure as the latter is increased above said fourth predetermined pressure.

6. A pressure regulating device as set forth in claim 5 wherein said second means comprises a chamber having a diaphragm dividing it into first and second compartments, said first compartment being in communication with the atmosphere, means for connecting said second compartment to a sub-atmospheric pressure, and means connecting said diaphragm to said first means.

7. Pressure regulating device as set forth in claim 6 wherein said means for connecting said second compartment to a subatmospheric pressure comprises a hollow subhousing having a subbore therein opening into the bore in said main housing, a piston member in said subbore, said subhousing having a diaphragm dividing it into two chambers, said piston member extending through said first chamber in said subhousing and through said diaphragm in said subhousing into said second chamber in said subhousing, means for connecting said first chamber to a subatmospheric pressure, means connecting said second chamber in said subhousing to said second compartment, said piston member having passages extending through the end thereof in said second chamber in said subhousing through said piston member to said first chamber in said subhousing.

8. A pressure regulating device as set forth in claim 7 wherein said third means comprises a passage in said subhousing connecting said second chamber therein with atmospheric pressure, a movable valve member adapted to be moved from a position wherein said passage in said subhousing is closed to a position wherein said passage in said subhousing is open, said piston member being adapted to move said valve member toward an open position when said inlet pressure is increased from said third predetermined pressure to said predetermined pressure, said piston member holding said valve member in an open position when the inlet pressure is above said fourth predetermined pressure.

References Cited
UNITED STATES PATENTS 3,321,917   5/1967   Tenniswood _____ 60—54.5

MARTIN P. SCHWADRON, *Primary Examiner.*

ROBERT R. BUNEVICH, *Assistant Examiner.*

U.S. Cl. X.R.

303—6